United States Patent Office 3,366,647
Patented Jan. 30, 1968

3,366,647
ERYTHRONOLIDE B ESTERS
Thomas J. Perun, Waukegan, Ill., assignor to Abbott Laboratories, North Chicago, Ill., a corporation of Illinois
No Drawing. Filed Aug. 26, 1965, Ser. No. 482,910
3 Claims. (Cl. 260—343)

ABSTRACT OF THE DISCLOSURE 3,5 - (substituted or unsubstituted) - phenolboronylerythronolide B and its corresponding 11-benzoyl or 11-alkanoyl esters are described. The new compounds are useful antischistomiasis drugs.

The present invention is directed to a series of new, pharmaceutically useful products; in particular it relates to boronic esters of erythronolide B. These new esters are therapeutically useful to combat infections of schistosomiasis.

Erythronolide B has been described as a hypocholesterolemic agent in U.S. 3,127,315. Generally, it is an alicyclic lactone with several active sites. The new chemical compounds have the chemical structure wherein R is hydrogen, benzoyl or a lower fatty acid acyl group and wherein R' is hydrogen, nitro, amino, chloro, bromo or loweralkyl. The term "loweralkyl" referred to herein is meant to include carbon chains of 1–7 carbons which may be straight or branched.

In a simple embodiment of the present invention, erythronolide B is dissolved in a suitable inert and anhydrous solvent and the solution is refluxed with an appropriately substituted phenylboronic acid. After several hours at reflux temperature, the solvent is partially evaporated and the new erythronolide 3,5-ester is collected in crystalline form. In a subsequent step, the 11-position may be esterified by treating the 3,5-ester with the desired acid anhydride or acid chloride.

To show some specific embodiments, reference is made to the following examples which are given here as illustrations only and are not meant to limit the invention.

*Example 1.—3,5-phenylboronylerythronolide B*

A solution of 10.0 gm. (0.025 mole) of erythronolide B in 500 ml. of hot, anhydrous acetone is mixed with 3.0 gm. (0.025 mole) of phenyl boronic acid and the mixture is refluxed for five hours. The solution is then concentrated to a volume of about 75 ml. and cooled to room temperature whereby a white crystalline solid forms. The crystals are collected; they represent 8.4 gm. of 3,5-phenylboronylerythronolide B, melting at 160–165° C. Upon further concentration of the filtrate, a second crop of 3.2 gm. of the same material melting at 160–164° C. is obtained. The solvated acetone is removed by drying the crystals in vacuo.

*Example 2.—11-acetyl-3,5-phenylboronylerythronolide B*

A solution of 2.0 gm. of 3,5-phenylboronylerythronolide B in 20 ml. of dry pyridine is combined with 2.0 ml. of acetic anhydride. The solution is allowed to stand at room temperature for 24 hours under anhydrous conditions and is subsequently poured into ice water. The formed precipitate is collected, washed with water and dried to give 1.5 gm. of 11-acetyl-3,5-phenylboronylerythronolide B, melting at 142–147° C. Upon recrystallization of this material from ethanol/water, 1.0 gm. of the pure product melting at 150–154° C. is obtained.

*Example 3.—11-propionyl-3,5-phenylboronylerythronolide B*

By repeating the procedure of Example 2, but replacing the acetic anhydride with propionic anhydride and by allowing the solution to stand for three days, 11-propionyl-3,5-phenylboronylerythronolide B is obtained. The pure compound has the melting point of 165–167° C.

*Example 4.—11-benzoyl-3,5-phenylboronylerythronolide B*

By replacing the acetic anhydride used in Example 2 with benzoyl chloride in an equimolar amount, 11-benzoyl-3,5-phenylboronylerythronolide B is obtained of which the pure crystals have a melting point of 190–192° C. Similarly, when replacing the above benzoyl chloride with hexanoyl chloride, 11-caproyl-3,5-phenylboronylerythronolide B is obtained.

*Example 5.—3,5-p-tolylboronylerythronolide B*

By following the procedure described in Example 1, but replacing phenylboronic acid with the equimolar amount of p-tolylboronic acid, 3,5-p-tolylboronylerythronolide B, melting at 201–203° C. is obtained.

*Example 6.—11-acetyl-3,5-p-tolylboronylerythronolide B*

By following the procedure described in Example 2, but replacing 3,5-phenylboronylerythronolide B with the corresponding 3,5-p-tolyl ester, 11-acetyl-3,5-p-tolylboronylerythronolide B, melting at 182–185° C. is obtained.

*Example 7.—3,5-m-nitrophenylboronylerythronolide B*

By replacing phenylboronic acid in Example 1 with m-nitrophenylboronic acid under otherwise identical conditions, 3,5-m-nitrophenylboronylerythronolide B, melting at 228–230° C. is obtained.

*Example 8.—11-acetyl-3,5-m-nitrophenylboronylerythronolide B*

The procedure of Example 2 is repeated but using 3,5-m - nitrophenylboronylerythronolide B in place of 3,5-phenylboronylerythronolide B. 11 - acetyl - 3,5 - m - nitrophenylboronylerythronolide B, melting at 172–174° C. is obtained in a similar yield.

*Example 9.—3,5-p-bromophenylboronylerythronolide B*

By following the procedure of Example 1, but substituting phenylboronic acid with p-bromophenylboronic acid in an equimolar amount, 3,5-p-bromophenylboronylerythronolide B is obtained.

Replacing the above p-bromophenylboronic acid with m-chlorophenylboronic acid, the analogous 3,5-m-chlorophenylboronylerythronolide B is obtained.

*Example 10.—3,5-m-aminophenylboronylerythronolide B*

The nitro group in the compound of Example 7 is reduced by placing 1.3 gm. of that compound in 100 mg. of ethanol, adding 0.125 gm. of 5% palladium-on-carbon as the catalyst and hydrogenating the mixture at 30° C. under 42 p.s.i.g. pressure. When the calculated amount of hydrogen is absorbed, the catalyst is filtered off and the filtrate is evaporated to form a glassy residue which is recrystallized from benzene. The pure 3,5-m-aminophenyl-boronylerythronolide B melts at 190–192° C.

It will be seen from the above examples that the hydroxy groups in the 3- and 5-positions can very easily be converted into the cyclic phenylboronyl esters carrying on the phenyl ring various substituents. If desired, the 11-hydroxy group can subsequently be esterified with a lower fatty acid or benzoic acid.

The reaction between the boronic acid derivative and erythronolide B can be carried out in various inert solvents. The solvent is preferably chosen in such a manner that it can easily be removed from the reaction mixture, e.g. the solvent should be of relatively low-boiling point or should form an azeotrope with water. Excellent results are obtained by using acetone, low molecular weight alcohols, benzene or chlorinated hydrocarbon solvents such as ethylene chloride.

All the compounds made in this manner are active against parasite infections, particularly against schistosomiasis infections. Excellent results are obtained by treating warm-blooded animals infected with *S. mansoni* by intraperitoneal injections of 10 mg./kg. for 1–5 days. With some of the new compounds, 5 mg./kg. is effective while other compounds are preferably injected in larger doses. Some of the new compounds can easily be administered in doses as high as 100 mg./kg. intraperitoneally, but usually such high doses are not needed except when only a single treatment is possible.

Others may practice the invention in any of the numerous ways which will be suggested to one skilled in the art by the present disclosure. All such practice of the invention is considered a part hereof provided it falls within the scope of the appended claims.

I claim:
1. An erythronolide B derivative of the structure

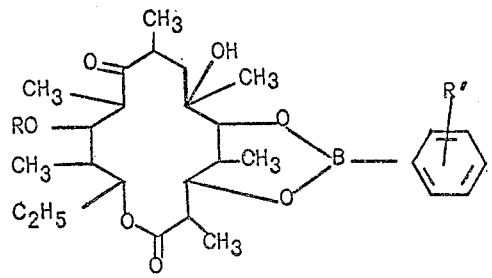

wherein R is hydrogen, benzoyl or a lower fatty acid acyl group, and wherein R' is hydrogen, nitro, amino, chloro, bromo or lower alkyl.

2. An erythronolide B derivative according to claim 1 wherein R is hydrogen.

3. An erythronolide B derivative according to claim 1 wherein R' is hydrogen.

References Cited

Theilheimer: Syn. Meth., vol. 14, item 155, p. 79. (1960).

Hung et al.: J. of Biol. Chem., vol. 240, No. 3, pp. 1322–6 (March 1956).

WALTER A. MODANCE, *Primary Examiner.*

C. SHURKO, *Assistant Examiner.*